(12) United States Patent
Schmidt

(10) Patent No.: US 11,148,096 B2
(45) Date of Patent: Oct. 19, 2021

(54) REACTOR FOR PURIFYING A GAS FLOW AND UNIT COMPRISING SUCH A REACTOR

(71) Applicant: COCKERILL MAINTENANCE & INGENIERIE SA, Seraing (BE)

(72) Inventor: Régis Schmidt, Balgau (FR)

(73) Assignee: COCKERILL MAINTENANCE & INGENIERIE SA, Seraing (BE)

(*) Notice: Subject to any disclaimer, the term of this patent is extended or adjusted under 35 U.S.C. 154(b) by 0 days.

(21) Appl. No.: 16/972,970

(22) PCT Filed: Jul. 10, 2019

(86) PCT No.: PCT/EP2019/068625
§ 371 (c)(1),
(2) Date: Dec. 7, 2020

(87) PCT Pub. No.: WO2020/011894
PCT Pub. Date: Jan. 16, 2020

(65) Prior Publication Data
US 2021/0245091 A1      Aug. 12, 2021

(30) Foreign Application Priority Data
Jul. 12, 2018   (FR) .................................. 18 56448

(51) Int. Cl.
*B01D 53/18*       (2006.01)
*B01J 19/00*       (2006.01)

(52) U.S. Cl.
CPC .......... *B01D 53/18* (2013.01); *B01J 19/0053* (2013.01); *B01D 2257/90* (2013.01); *B01D 2257/93* (2013.01); *B01D 2258/025* (2013.01)

(58) Field of Classification Search
CPC .......................... B01D 53/18; B01D 2257/90; B01D 2257/93; B01D 2258/025; B01J 19/0053; B01J 19/0073
USPC .............................. 96/243, 267, 355; 95/149
See application file for complete search history.

(56) References Cited

U.S. PATENT DOCUMENTS

| | | | | |
|---|---|---|---|---|
| 3,323,290 A | * | 6/1967 | Stern ...................... | B01D 47/10 |
| | | | | 95/218 |
| 3,841,060 A | | 10/1974 | Hoad | |
| 3,853,515 A | * | 12/1974 | Davis ..................... | B01D 47/06 |
| | | | | 96/358 |
| 3,918,518 A | | 11/1975 | James | |

(Continued)

FOREIGN PATENT DOCUMENTS

JP        2009-727744     *  4/2009

OTHER PUBLICATIONS

English translation of the Written Opinion issued in corresponding to PCT Application No. PCT/EP2019/068625 dated Oct. 21, 2019. (pp. 7).

*Primary Examiner* — Frank M Lawrence, Jr.
(74) *Attorney, Agent, or Firm* — Muncy, Geissler, Olds & Lowe, PC

(57) ABSTRACT

The invention relates to a reactor for purifying a gas flow by contact with a liquid. The reactor comprises a chamber which delimits a channel having an inlet opening and an outlet opening for the gas flow. The chamber has walls made of a flexible material which is secured to an inflatable structure which is provided with means for retaining pressurised air therein in order to form a self-supporting flexible structure with trapped air.

15 Claims, 3 Drawing Sheets

(56) References Cited

U.S. PATENT DOCUMENTS

| | | | |
|---|---|---|---|
| 5,284,628 A | | 2/1994 | Prueitt |
| 5,311,620 A | * | 5/1994 | Ratje .................. A47K 3/325 |
| | | | 4/599 |
| 5,497,633 A | * | 3/1996 | Jones .................. B05B 7/0075 |
| | | | 62/314 |
| 2005/0126106 A1 | | 6/2005 | Murphy et al. |
| 2008/0257396 A1 | | 10/2008 | Chan et al. |
| 2015/0299641 A1 | * | 10/2015 | Galliher ............... B01F 15/065 |
| | | | 435/298.1 |

* cited by examiner

REACTOR FOR PURIFYING A GAS FLOW AND UNIT COMPRISING SUCH A REACTOR

The present invention relates to a reactor for purifying a gas stream by contact with a liquid. The invention relates likewise to an installation including such a reactor, and also to the use of such an installation.

TECHNOLOGICAL BACKGROUND OF THE INVENTION

Absorption by a wet process is a technique commonly used for treating pollutants contained in gaseous emissions. It is applied in particular to emissions associated with combustion, to acid emissions, and to odors. By way of example, such pollutants are produced by businesses performing surface treatments, waste incineration, wastewater treatments, or indeed knackering.

Treating gaseous emissions by the wet process absorption method consists in neutralizing the contaminants by using a purifying liquid. The purifying liquid, the nature of which varies as a function of the contaminants to be treated, is put into contact with gaseous emissions inside a reactor such as a gas scrubber. The contaminants are then captured by the liquid and thus extracted from the gas stream.

The reactor, which is generally made out of rigid non-deformable materials such as a thermoplastic material or a metal such as stainless steel, can give rise to certain problems, in particular when the gas for treatment has a flow rate that is considerable. Specifically, the reactor can then be particularly voluminous, having a height of several tens of meters and a diameter of several meters, typically five meters.

The reactor can thus require special transport means, such as a road convoy for an "oversize" or "abnormal" load, in order to be transported from the place where it is manufactured to the place where it is installed, which places may be situated in different countries. Transporting the reactor can then be found to be extremely expensive, making the reactor unaffordable for certain operators.

Furthermore, the weight of the reactor can be very great, which can give rise to difficulties while installing it or while moving it, and in particular difficulties in the event of maintenance or of replacement.

Furthermore, the raw material cost of the reactor, regardless of whether it is made out of metal or out of a rigid polymer, can be very great. The sale price of the reactor, which depends in part on the cost of its raw materials, can then be found to be excessive for certain operators.

OBJECT OF THE INVENTION

An object of the invention is thus to propose a reactor for purifying a gas stream that obviates the above-mentioned drawbacks, at least in part.

SUMMARY OF THE INVENTION

To this end, the invention proposes a reactor for purifying a gas stream by contact with a liquid. The reactor comprises an enclosure defining a channel having an inlet orifice and an outlet orifice for the gas stream.

According to the invention, the enclosure has flexible material walls secured to an inflatable structure provided with means for retaining air under pressure therein so as to form a self-supporting flexible structure. The walls of the enclosure include at least two openings facing each other and each receiving in sealed manner a portion of a reinforcing bar that passes through the enclosure.

Such a trapped air structure serves to reduce the volume occupied by the reactor when it is not in operation and while it is in a deflated state. This makes it easier to transport and its weight is reduced.

Furthermore, using a flexible structure makes it possible to reduce the quantity of raw material needed for manufacturing the reactor, and thus to reduce its cost of production.

Furthermore, the presence of reinforcing bars serves in particular to improve the stiffness of the enclosure and thus its behavior in operation.

In particular manner, the inflatable structure is shaped substantially to operate with the channel in the vertical position.

In a preferred embodiment of the invention, the enclosure comprises a first portion of substantially cylindrical shape and a second portion of substantially frustoconical shape arranged in line with the first portion. Said portions are connected together hermetically, and the inlet and outlet orifices for the gas stream are arranged at respective free ends of the first and second portions.

The two-part design of the reactor serves in particular to make it easier to manufacture and also easier to transport. It also serves to make it easier to install equipment inside the reactor, such as a sprinkler/spray boom or a droplet catcher.

According to a particular characteristic, the inflatable structure has a first part facing the first portion of the enclosure, which first part includes chambers communicating with one another and extending over substantially the entire length of said portion.

In particular, such an arrangement of the first part of the inflatable structure enables the volume of the first portion of said reactor to be well maintained.

According to another particular characteristic, the inflatable structure has a second part facing the second portion of the enclosure, which second part includes a chamber forming rings that are superposed on one another.

In particular, such an arrangement of the second part of the inflatable structure enables the volume of the second portion of said reactor to be well maintained.

In particular manner, the first and second parts of the structure are connected together by stainless steel cables.

According to a particular characteristic, the structure includes rigid reinforcement such as metal rings for stiffening the enclosure.

The presence of rigid reinforcement also serves to make the inflatable structure easier to fold, in particular for storage and transport purposes.

In particular manner, the walls of the enclosure include at least one opening that receives a shutter in sealed manner.

The presence of such an opening makes it possible to access the inside of the enclosure, and more particularly to form hatches for maintenance.

In particular manner, at least one sprinkler boom enabling the liquid to be injected into the inside of the enclosure in the form of a mist of fine droplets.

According to a particular characteristic, the sprinkler boom is connected to an admission duct for the liquid and includes holes enabling the liquid to escape in droplets that are then sprayed by the gas stream flowing inside the channel.

In particular manner, a droplet catcher for coalescing said liquid is arranged substantially at the junction between the first and second portions of the enclosure.

In particular manner, the walls of the enclosure are made out of a flexible material constituted by a thermoplastic polymer, specifically polyvinyl chloride (PVC). Other materials could be envisaged, such as high-density polyethylene (HDPE) or polypropylene (PP).

The invention also provides an installation for treating a gas stream with a liquid, the installation including at least one reactor according to any preceding claim, wherein the gas stream is gas carrying odorous and/or toxic compounds that are trapped in the liquid fed simultaneously into the reactor.

The invention also provides the use of such an installation for purifying a gas stream before it is discharged into the surrounding atmosphere, the gas stream coming from a device that generates gas carrying undesirable odorous and/or toxic compounds. According to a particular characteristic, the device that generates gas carrying odorous and/or toxic compounds is a unit for composting organic waste, a business performing surface treatments, a wastewater treatment station, a food processing factory, or a knacker's yard.

It should be understood that that means such an installation can be used in a very wide variety of fields of activity such as agribusiness, metallurgy, automotive, aviation, nuclear, . . . . In general manner, such an installation can be used for any gas scrubbing treatment.

DESCRIPTION OF THE FIGURES

The invention can be better understood in the light of the following description, which description is purely illustrative and nonlimiting, and should be read with reference to the accompanying figures, in which.

DETAILED DESCRIPTION OF A PARTICULAR EMBODIMENT OF THE INVENTION

Figure 1:
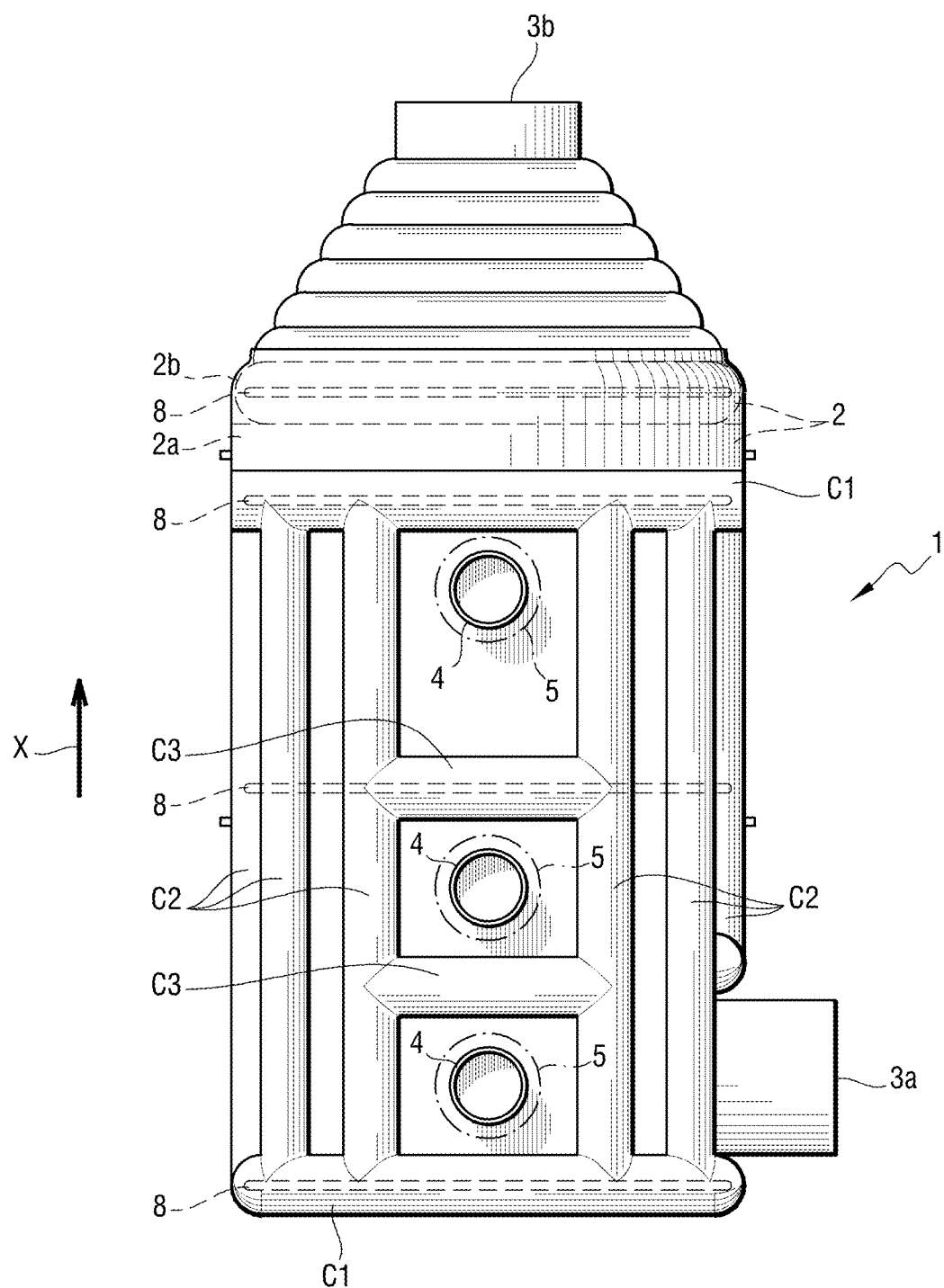
FIG. 1 is a diagram showing a reactor in a particular embodiment of the invention.
Figure 2:
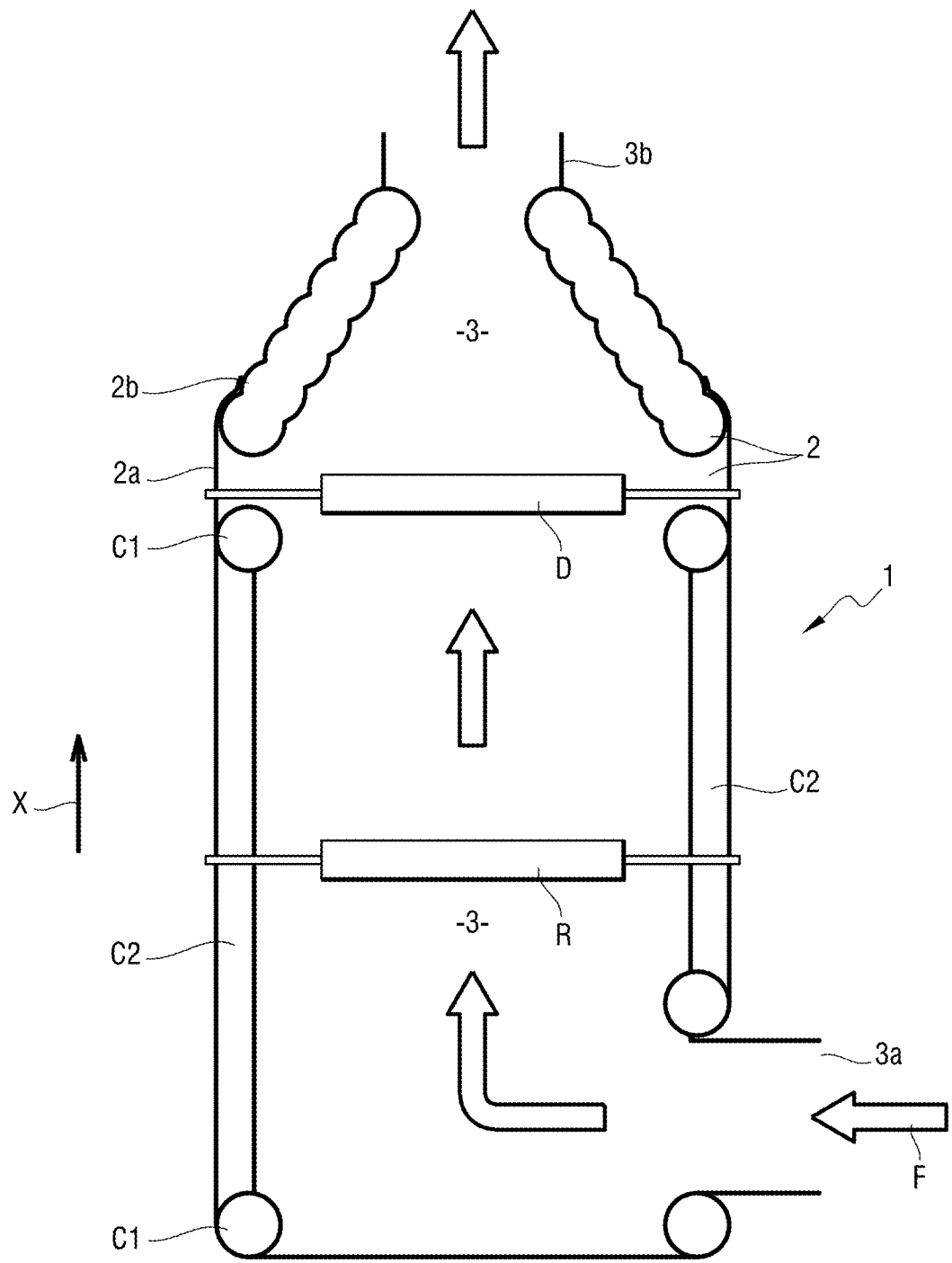
FIG. 2 is a longitudinal section view of the reactor shown in FIG. 1.

With reference to FIGS. 1 and 2, a reactor 1 for purifying a gas stream F comprises an enclosure 2 defining a channel 3 having an inlet orifice 3a and an outlet orifice 3b for the gas stream.

The enclosure 2 is substantially tubular in shape about an axis X (a vertical axis in this example), and along the axis X it comprises in succession a first portion 2a and a second portion 2b. The first portion 2a is of a shape that is substantially cylindrical of circular section and it has walls made of a flexible material that are constituted in this example by a sheet of polyvinyl chloride (PVC). The inlet orifice 3a for the gas stream is arranged horizontally in the bottom part of the first portion 2a.

The walls of the first portion 2a are secured to a first part of an inflatable structure that comprises two annular chambers C1, each extending horizontally at a respective end of the first portion 2a, and cylindrical chambers C2 extending vertically along the full height of the first portion 2a in order to connect the two annular chambers C1 together.

Air under pressure is injected into the chambers C1 and C2 via a filler orifice, which orifice is provided with a check valve enabling the air to be retained once filling has finished.

The walls of the first portion 2a include three circular openings 4 of identical size leading to the channel 3. The three openings 4 are in alignment and they are distributed along the height of said portion 2a (visible in FIG. 1). The series of openings 4 is made between two chambers C2 that are connected together by transverse chambers C3 serving to stiffen the enclosure and to limit any risk of the enclosure tearing as a result of the weight of the elements fastened to the edges of the openings 4. The walls of the first portion 2a also include three other openings (not visible in FIG. 1) facing the openings 4.

Figure 3:
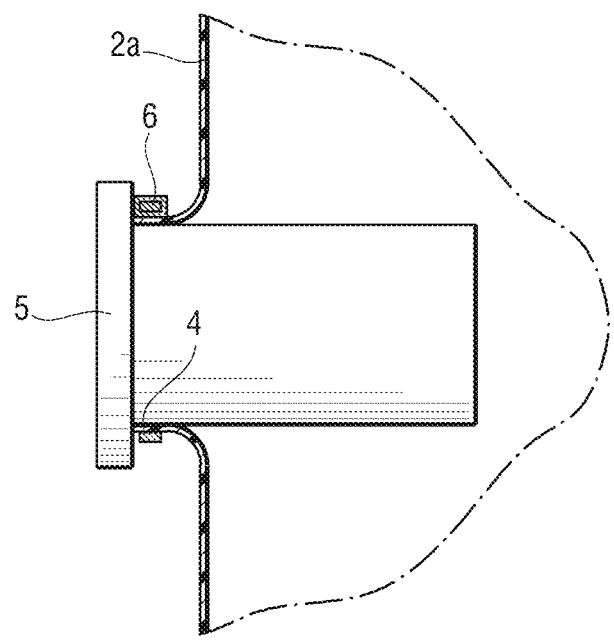
FIG. 3 is a fragmentary section view of a shutter arranged in an opening of the reactor shown in FIG. 1.

In this example, and as shown in FIG. 3, each of these six openings receives a respective shutter 5 in leaktight manner so as to prevent the gas stream F from escaping via said openings. By way of example, the shutters 5 may be held in the openings 4 by clamping collars 6 of the hose-clamp type, or by screw fastening.

Figure 4:
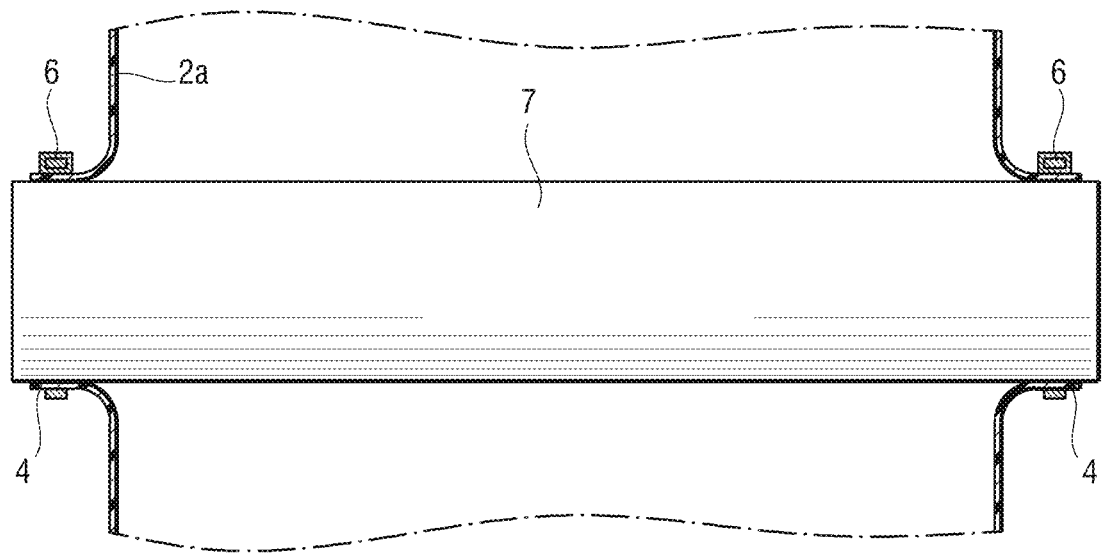
FIG. 4 is a fragmentary section view of a reinforcing bar passing through the reactor shown in FIG. 1.

As shown in FIG. 4, each of the openings 4 can also receive in leaktight manner a portion of a reinforcing bar 7 passing through the first portion 2a. By way of example, the reinforcing bars 7 may be held in the openings 4 by means of clamping collars 6 of the hose-clamp type. The presence of the reinforcing bars 7 serves in particular to improve the structural stability and the stiffness of the enclosure and thus its behavior in operation, and also to optimize the distribution of forces and to limit potential deformation and delamination.

The enclosure also includes a second portion 2b that is substantially frustoconical in shape, extending along the axis X and having a base (its section of largest diameter) facing downwards. The second portion 2b is arranged in line with the first portion 2a, the base of the second portion 2a thus resting on the top end of the first portion 2a. In this example, the diameter of the base of the frustoconical second portion 2b is substantially equal to the diameter of the cylindrical first portion 2a.

In identical manner to the first portion 2a, the second portion 2b has walls made of flexible material that are constituted in this example by a sheet of polyvinyl chloride (PVC).

The outlet orifice 3b for the gas stream is arranged in the top part of the second portion 2b along the axis X and it has a diameter that is substantially equal to the diameter of the top end of the frustoconical second portion 2b (i.e. its section of smallest diameter).

The walls of the second portion 2b are secured to a second part of the inflatable structure that comprises a chamber extending over substantially the full height of the frustoconical second portion 2b, forming rings that are superposed horizontally on one another.

In the same manner as for the first portion 2a, air under pressure is injected into the chamber via a filler orifice, which orifice is provided with a check valve enabling the air to be retained once filling has finished.

The top end of the first portion 2a covers the bottom ring of the second portion 2b completely, and it covers the ring adjacent to said bottom ring in part. The top end of the first portion 2a and the bottom ring of the second portion 2b are provided with tabs or hooks serving to pass a fastener cable that can be tightened in order to press the first and second portions 2a and 2a against each other. In this example, the cable is made of stainless steel and it is arranged between these two rings in order to press the first and second portions of the inflatable structure of the enclosure 2 against each other. For reasons of clarity, the cable is not shown in the figures.

The first and second parts of the inflatable structure of the enclosure 2 thus form a self-supporting flexible structure that is shaped in this example to operate with the channel 3 positioned vertically.

For reasons of reactor stiffness, in this example the inflatable structure of the enclosure 2 includes metal rings 8 distributed along the height of the enclosure 2 so as to guarantee zones that are not deformable.

Thus, the structure of the first portion 2a of the enclosure 2 has two metal rings 8 arranged at each of the two ends of said portion 2a, i.e. level with the chambers C1, and a third metal ring 8 arranged substantially in the middle of said portion 2a.

The structure of the second portion 2b of the enclosure includes a metal ring 8 in its bottom part at the base of said portion 2b.

The reactor 1 includes a sprinkler boom R arranged inside the first portion 2a of the enclosure above the inlet orifice 3a for the gas stream F, substantially in the middle of the first portion 2a. The sprinkler boom R is fastened to rigid tubes that pass right through the inflatable structure of the first portion 2a and take up the load at the thickness of said inflatable structure. The sprinkler boom includes holes enabling the liquid, also referred to as the scrubbing liquid, to escape in droplets that are then sprayed by the gas stream flowing inside the channel 3. The gas for purifying then comes into contact with the liquid dispersed inside the enclosure 2 in the form of a mist.

After coming into contact with the liquid and reacting chemically therewith, the purified gas then escapes via the outlet orifice 3b. Nevertheless, the liquid is retained inside the enclosure 2 by means of a droplet catcher D arranged substantially at the junction between the first portion 2a and the second portion 2b of the enclosure 2. The droplet catcher D is fastened to rigid tubes that pass right through the inflatable structure of the first portion 2a and take up the load at the thickness of said inflatable structure. The droplet catcher D thus serves to coalesce and collect said scrubbing liquid.

In an example embodiment, the reactor presents a diameter of substantially 5 meters (m) and a height of substantially 10 m.

Naturally, the invention is not limited to the embodiment described but covers any variant coming within the ambit of the invention as defined by the claims.

Although above the inflatable structure is shaped to operate with the channel 3 positioned vertically, it is naturally possible to envisage operation in the horizontal position.

Naturally any other shape of inflatable structure could be envisaged, providing it forms a structure that is flexible and self-supporting.

Although above a single filler orifice is provided for filling the inflatable structure of the first portion 2a with air under pressure, it is also possible to provide a plurality of filler orifices, in particular when the chambers are not all in communication with one another.

Although above the second portion 2b of the enclosure has only one chamber, it could also have a plurality of chambers, which would then require a plurality of filler orifices.

The invention claimed is:

1. A reactor for purifying a gas stream by contact with a liquid, the reactor comprising an enclosure defining a channel having an inlet orifice and an outlet orifice for the gas stream, the enclosure having flexible material walls secured to an inflatable structure provided with means for retaining air under pressure therein so as to form a self-supporting flexible structure, and the walls of the enclosure including at least two openings facing each other and each receiving in sealed manner a portion of a reinforcing bar that passes through the enclosure.

2. The reactor according to claim 1, wherein the inflatable structure is shaped substantially to operate with the channel in the vertical position.

3. The reactor according to claim 1, wherein the enclosure comprises a first portion of substantially cylindrical shape and a second portion of substantially frustoconical shape arranged in line with the first portion, said portions being connected together hermetically, and the inlet and outlet orifices for the gas stream being arranged at respective free ends of the first and second portions.

4. The reactor according to claim 3, wherein the inflatable structure has a first part facing the first portion of the enclosure, which first part includes chambers communicating with one another and extending over substantially the entire length of said portion.

5. The reactor according to claim 3, wherein the inflatable structure has a second part facing the second portion of the enclosure, which second part includes a chamber forming rings that are superposed on one another.

6. The reactor according to claim 3, wherein the first and second parts of the structure are connected together by stainless steel cables.

7. The reactor according to claim 1, wherein at least one of the walls of the enclosure includes at least one opening that receives a shutter in sealed manner.

8. The reactor according to claim 1, including at least one sprinkler boom enabling the liquid to be injected into the inside of the enclosure in the form of a mist of fine droplets.

9. The reactor according to claim 7, wherein the sprinkler boom is connected to an admission duct for the liquid and includes holes enabling the liquid to escape in droplets that are then sprayed by the gas stream flowing inside the channel.

10. The reactor according to claim 1, wherein the walls of the enclosure are made of a material constituted by a thermoplastic polymer comprising polyvinyl chloride, high-density polyethylene, or polypropylene.

11. An installation for treating a gas stream with a liquid, the installation including at least one reactor according to claim 1, wherein the gas stream is a gas carrying odorous and/or toxic compounds that are trapped in the liquid fed into the reactor.

12. A use of the installation according to claim 11, for purifying a gas stream before it is discharged into the surrounding atmosphere, the gas stream coming from a device that generates gas carrying undesirable odorous and/or toxic compounds.

13. The use of the installation according to claim 12, wherein the device that generates gas carrying odorous and/or toxic compounds is a unit for composting organic waste, a business performing surface treatments, a wastewater treatment station, a food processing factory, or a knackers yard.

14. The reactor according to claim 3, wherein a droplet catcher for coalescing the liquid is arranged substantially at the junction between the first and second portions of the enclosure.

15. A reactor according to claim 1, wherein the inflatable structure includes rigid reinforcement comprising metal rings for stiffening the enclosure.

* * * * *